United States Patent [19]

Alferness et al.

[11] Patent Number: 5,379,392
[45] Date of Patent: Jan. 3, 1995

[54] METHOD OF AND APPARATUS FOR RAPIDLY LOADING ADDRESSING REGISTERS

[75] Inventors: Merwin H. Alferness, New Brighton; John Z. Nguyen, Roseville, both of Minn.

[73] Assignee: Unisys Corporation, Allentown, Pa.

[21] Appl. No.: 809,386

[22] Filed: Dec. 17, 1991

[51] Int. Cl.6 .......................... G06F 12/06; G06F 9/35
[52] U.S. Cl. ................... 395/400; 364/255.1; 364/255.2; 364/255.5; 364/258.1; 364/259.2; 364/DIG. 1
[58] Field of Search ..................... 395/400, 425

[56] References Cited

U.S. PATENT DOCUMENTS

| | | | |
|---|---|---|---|
| 3,389,380 | 6/1968 | Ashbaugh et al. | 395/400 |
| 3,461,433 | 8/1969 | Emerson | 395/400 |
| 4,355,355 | 10/1982 | Butwell et al. | 395/400 |
| 4,521,846 | 6/1985 | Scalzi et al. | 395/400 |
| 4,825,358 | 4/1989 | Letwin | 395/700 |
| 4,825,363 | 4/1989 | Baumann et al. | 395/375 |
| 4,827,065 | 5/1989 | Bischoff et al. | 395/425 |
| 4,827,400 | 5/1989 | Dunwell et al. | 395/400 |
| 4,835,677 | 5/1989 | Sato et al. | 395/700 |
| 4,841,436 | 6/1989 | Asano et al. | 395/250 |
| 4,853,849 | 8/1989 | Bain, Jr. et al. | 395/400 |
| 4,862,349 | 8/1989 | Foreman et al. | 395/700 |
| 4,890,221 | 12/1989 | Gage | 395/775 |
| 4,903,196 | 2/1990 | Pomerene et al. | 395/375 |
| 4,939,640 | 7/1990 | Bachman et al. | 395/375 |
| 4,979,098 | 12/1990 | Baum et al. | 395/400 |
| 5,210,840 | 5/1993 | Fukagawa et al. | 395/400 |

*Primary Examiner*—Jack B. Harvey
*Assistant Examiner*—Michael A. Whitfield
*Attorney, Agent, or Firm*—Nawrocki, Rooney & Sivertson

[57] ABSTRACT

An apparatus for and method of loading the user addressing base register of a large scale multiprogrammed instruction processor. The base register is normally loaded to permit a user application program to access a different data segment. Providing a base register addressing environment for user application programs permits the software to be developed using virtual addressing. The addressing environment is specified by a stack of base registers. These are loaded from a data store specifying a virtual address for each data segment. During the loading process, an absolute address corresponding to the virtual address is loaded into each base register. To load a base register, a determination is made whether the future value differs from the previous value by a differential offset. If yes, the base register is loaded with an absolute address corresponding to the sum of the previous bank descriptor and the new offset. If no, the new base register value is computed by accessing a bank description table.

22 Claims, 13 Drawing Sheets

| | | |
|---|---|---|
| B1 $L_1$ | $BDI_1$ | $OFFSET_1$ |
| B2 $L_2$ | $BDI_2$ | $OFFSET_2$ |
| B3 $L_3$ | $BDI_3$ | $OFFSET_3$ |
| B4 $L_4$ | $BDI_4$ | $OFFSET_4$ |
| B5 $L_5$ | $BDI_5$ | $OFFSET_5$ |
| B6 $L_6$ | $BDI_6$ | $OFFSET_6$ |
| B7 $L_7$ | $BDI_7$ | $OFFSET_7$ |
| B8 $L_8$ | $BDI_8$ | $OFFSET_8$ |
| B9 $L_9$ | $BDI_9$ | $OFFSET_9$ |
| B10 $L_{10}$ | $BDI_{10}$ | $OFFSET_{10}$ |
| B11 $L_{11}$ | $BDI_{11}$ | $OFFSET_{11}$ |
| B12 $L_{12}$ | $BDI_{12}$ | $OFFSET_{12}$ |
| B13 $L_{13}$ | $BDI_{13}$ | $OFFSET_{13}$ |
| B14 $L_{14}$ | $BDI_{14}$ | $OFFSET_{14}$ |
| B15 $L_{15}$ | $BDI_{15}$ | $OFFSET_{15}$ |

FIG. 8

METHOD OF AND APPARATUS FOR RAPIDLY LOADING ADDRESSING REGISTERS

CROSS REFERENCE TO CO-PENDING APPLICATIONS

The present application is related to U.S. patent application Ser. No. 07/762,282, filed Sep. 19, 1991. entitled "Cooperative Hardware and Microcode Control System for Pipelined Instruction Execution", and U.S. patent application Ser. No. 07/762 276, filed Sep. 19, 1991, entitled "Data Coherency Protocol for Multi-Level Cached High Performance Multiprocessor System" and continued as application Ser. No. 09/235,196, both assigned to the assignee of the present invention and both incorporated herein by reference.

BACKGROUND OF THE INVENTION

1. Field of the Invention

The present invention generally relates to general purpose digital data processing systems and more particularly relates to such systems which execute multiple programs.

2. Description of the Prior Art

It is now common in large scale data processing systems to permit software developers to treat real storage as virtual memory. This is a technique wherein all memory accesses by a specific user program are relative in nature. The major advantage of this approach is that memory management can be efficiently performed by the system at the time of program execution depending upon resource availability and requests from other users. The memory management process appears transparent to the user. The 2200/600 system available from the assignee of the present invention, and incorporated herein by reference, is such a system employing virtual addressing.

U.S. Pat. No. 4,827,406 issued to Bischoff et al, shows one method of handling virtual addressing. It is currently most desirable to structure an architecture in which the software makes address references relative to an addressing environment which can be readily loaded along with the program and can be modified during program operation as necessary. The actual physical memory space must be addressed, of course, using an absolute rather than a relative address. To accomplish this, the virtual (or relative) address is converted to an absolute address using a translation table. A typical translation scheme is shown in U.S. Pat. No. 4,827,400 issued to Dunwell et al.

Further convenience and performance enhancements occur by dividing the virtual address space into fixed length pages and by dividing the real address space into blocks. The system is thus enhanced by providing logical divisions for programming purposes while accessing main memory by a hardware efficient block size. The conversion hardware efficiently performs the required translations without subjecting the user to the resulting bookkeeping. As a result, the storage resources of the system are efficiently managed in real time without unnecessary concern by the users.

The registers which store the data permitting conversion from the virtual address of a software program to the real address used by the physical storage system are assumed to be unique to that software program. The virtual address for a program or operand segment is loaded into the active base table. The corresponding absolute address of the segment is computed and placed into a base register. As different programs are loaded and run, the contents of these registers must be modified. Similarly, the contents of one or more of the registers may need to be modified during the operation of a given program to permit access to different segments of data located at different virtual addresses. U.S. Pat. No. 4,862,349 issued to Foreman et al, shows a technique for user modification of control block data. However, care must be exercised to prevent one program from inadvertently impacting another, unrelated program. U.S. Pat. No. 4,835,677 issued to Sato et al, shows a typical hardware protection approach. Notification to multiple users of a General Purpose Register set is provided by the technique of U.S. Pat. No. 4,903,194 issued to Pomerene et al.

User modification of address translation tables must be accompanied by modification of addressing limits to maintain data security. Furthermore, it is desirable that the user program be permitted to change the conversion tables using virtual addressing. Unfortunately, complete modification of all of these quantities consumes a substantial amount of processor capacity. Studies have shown that as many as 85% of the base register modification operations during the execution of a particular user program change only the offset within a bank. Yet prior art systems continue to modify all of the conversion variables.

A common opportunity for changing the data registers which translate virtual to absolute addresses is during interrupts which transition the processor from one state to another, and at the initiation of an application program after the partial or complete run of a different and unrelated application program. The assignee of the present invention has for some time provided systems wherein the executive and user states have dedicated registers to mitigate a portion of this problem. A less efficient approach may be found in U.S. Pat. No. 4,825,358 issued to Letwin. U.S. Pat. No. 4,853,849 issued to Bain, Jr. et al, shows an alternative technique for input/output transfers.

Most modern large scale data processing systems also employ some form of microprocessing and pipelining. U.S. Pat. No. 4,825,363 issued to Baumann et al, and U.S. Pat. No. 4,841,436 issued to Asano et al, show microprocessor based architectures. U.S. Pat. No. 4,890,221 issued to Gage and U.S. Pat. No. 4,939,640 issued to Bachman et al, show architectures wherein the environment is saved by storing all of the variables.

SUMMARY OF THE INVENTION

The present invention overcomes many of the disadvantages of the prior art by providing a method of and apparatus for rapidly modifying the user base registers of an instruction processor. The major advantage of this approach occurs when a user program needs to change only a portion of its operating environment during execution such as initiation of a new or different operand segment. The performance enhancement results from the use of a radio change algorithm for situations wherein this is appropriate. Therefore, the greatest operating advantage is experienced when different operand segments have logically related virtual addresses.

In the preferred mode, a bank of base registers is employed to store the absolute addresses for the initial word of each data segment. The memory accesses generated by the user program are explicitly or implicitly made relative to the contents of one of the base registers. Also stored within the base registers are the corresponding security limits which bound user accesses.

The active base table is a register stack wherein each entry is a virtual address corresponding to the absolute address within the related base register. The virtual address from a given active base table entry specifies a given one of the bank descriptor tables and provides a bank descriptor index for access to a specific entry in the selected one of the bank descriptor tables. Adding that bank descriptor entry to the offset from the virtual address yields the absolute memory address for loading into the associated base register. The user access limits are also computed.

It is convenient during the software development process to use a different base register for each logical segment accessed by the program. Upon the initiation of a given application program, the active base table and the base register bank are loaded with the data related to that application program. During execution of that program, the environment may be modified by loading or modifying various of the base registers to provide access to yet other data segments.

The design of the preferred mode instruction processor provides an instruction base register and 15 separate user base registers for operand access. Therefore, 15 separate storage locations within the active base table are also required. The virtual addresses for the initiation of a user program are loaded into the active base table, the absolute addresses are computed, and the user base registers are loaded prior to transfer of control to that program. As the user program is executed, the contents of one or more base registers may be modified under user control to access other data segments.

For each such modification, an instruction processor according to the present invention determines the extent of the modification required. If the modification requires loading of the base register using the same bank descriptor table and bank descriptor index, it is known that the difference between the prior contents of the base register and the future contents of the base register differ only by the offset. For such base register changes, the offset is modified by a simple arithmetic operation without further memory references. The limits are also modified. The performance enhancement results from the elimination of the complete absolute address computation in those cases wherein only the offset is changed.

Though the preferred mode is associated with rapid loading of a base register address by a user application program, the technique is applicable to various other environmental changes depending upon the machine architecture.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 shows the format of the active base table:

DETAILED DESCRIPTION OF THE PREFERRED EMBODIMENTS

Figure 1:
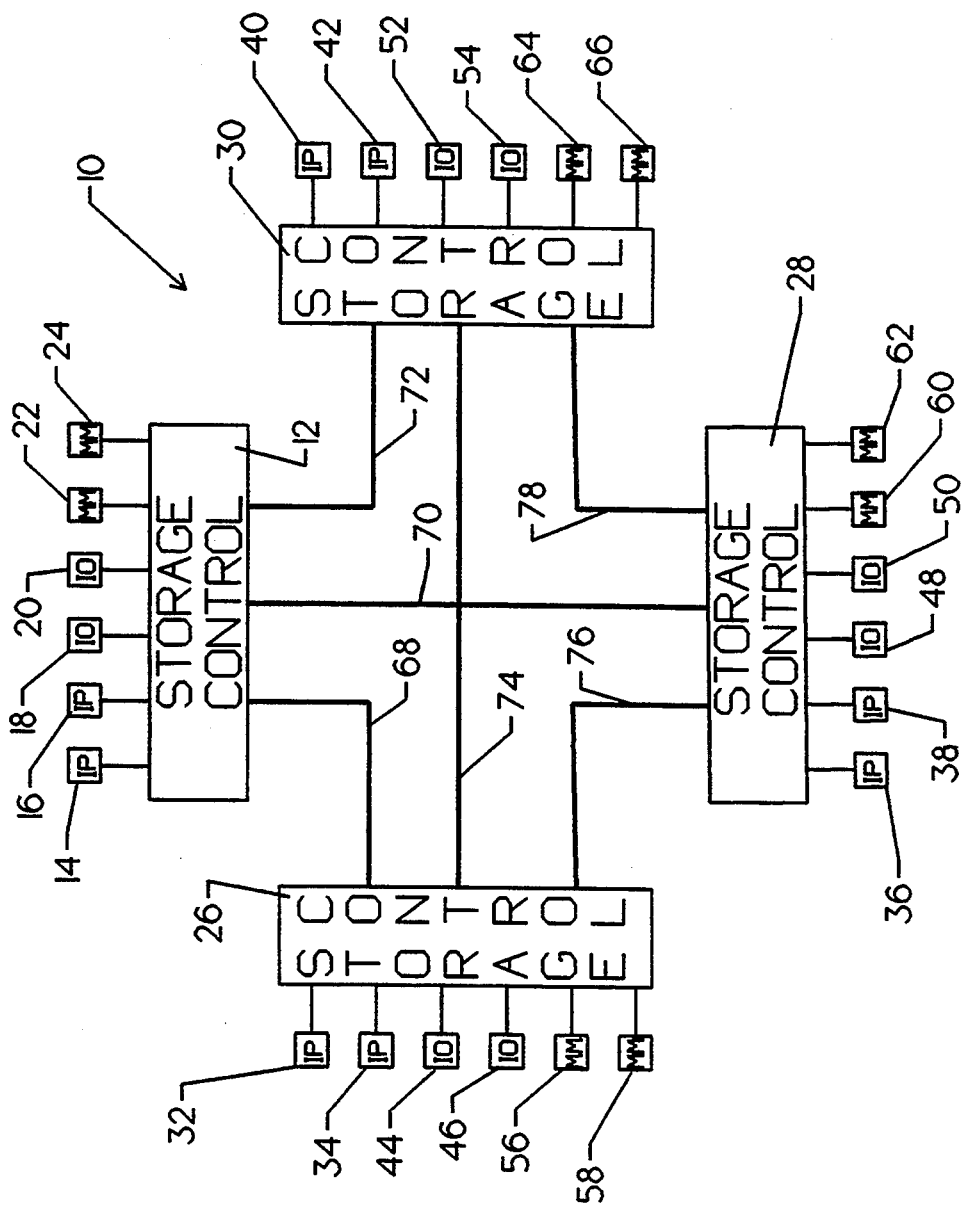
FIG. 1 is a schematic diagram of a fully populated data processing system incorporating the present invention.

FIG. 1 is an overall diagram of fully populated data processing system 10 according to the present invention. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. patent application which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Figure 2:
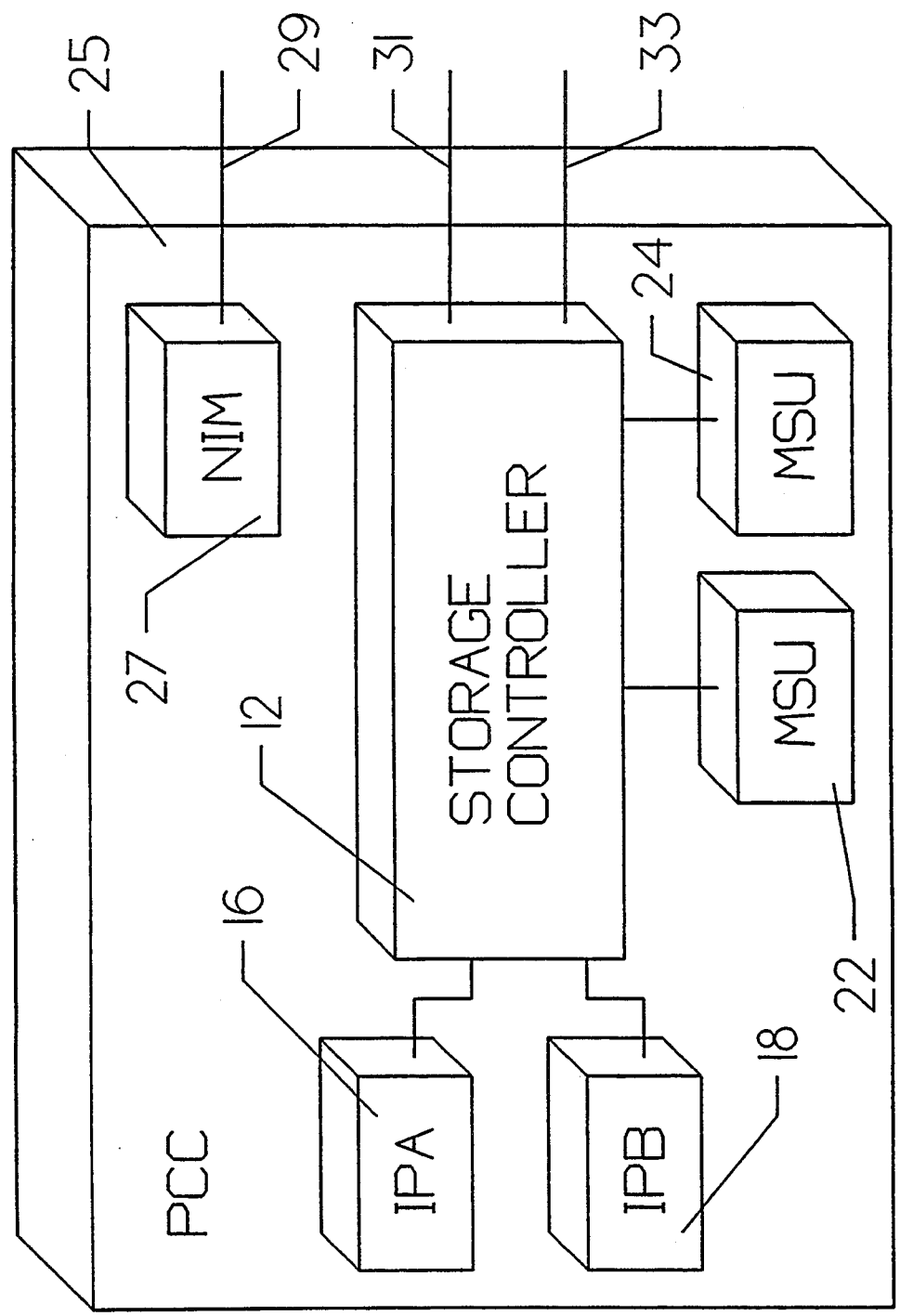
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module (i.e. NIM) 27 provide an interface to the operator console via cable 29. Cables 31 and 33 couple input/output units 18 and 20 (see also FIG. 1) to storage controller 12. Input/output units 18 and 20 are physically packaged in an Input/output Complex Cabinet (i.e. ICC) which is not shown for clarity. Other referenced elements are as previously described.

Figure 3:
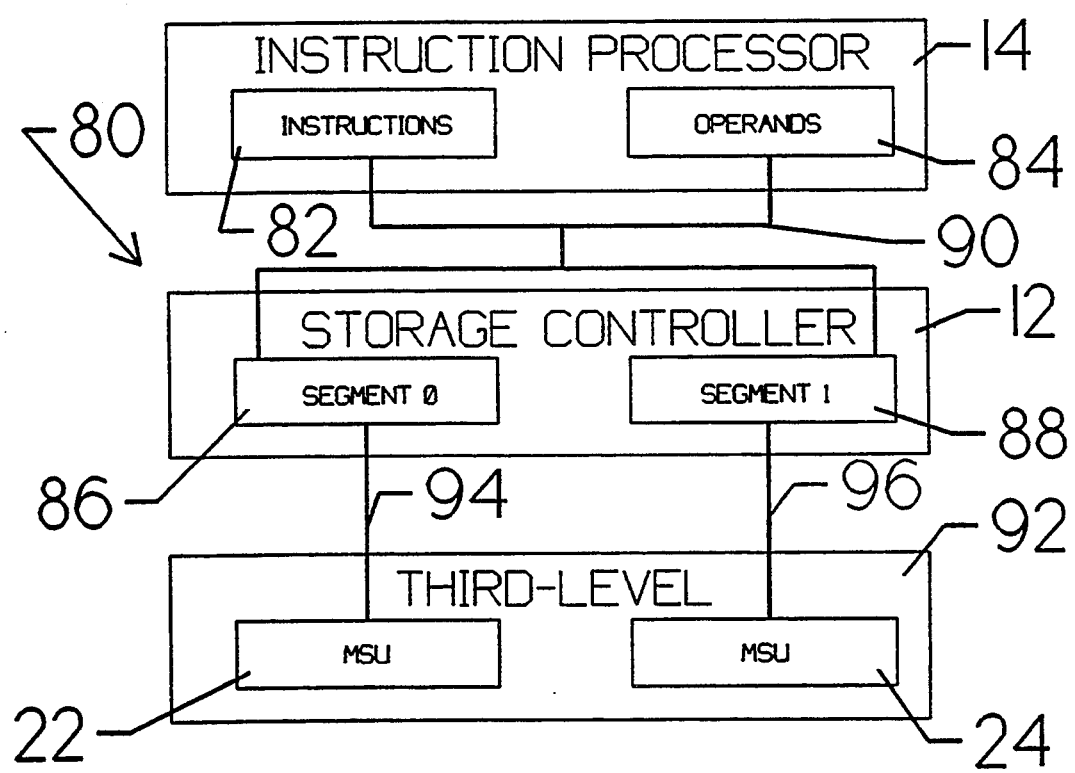
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains an intermediate level cache segment of 128 k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
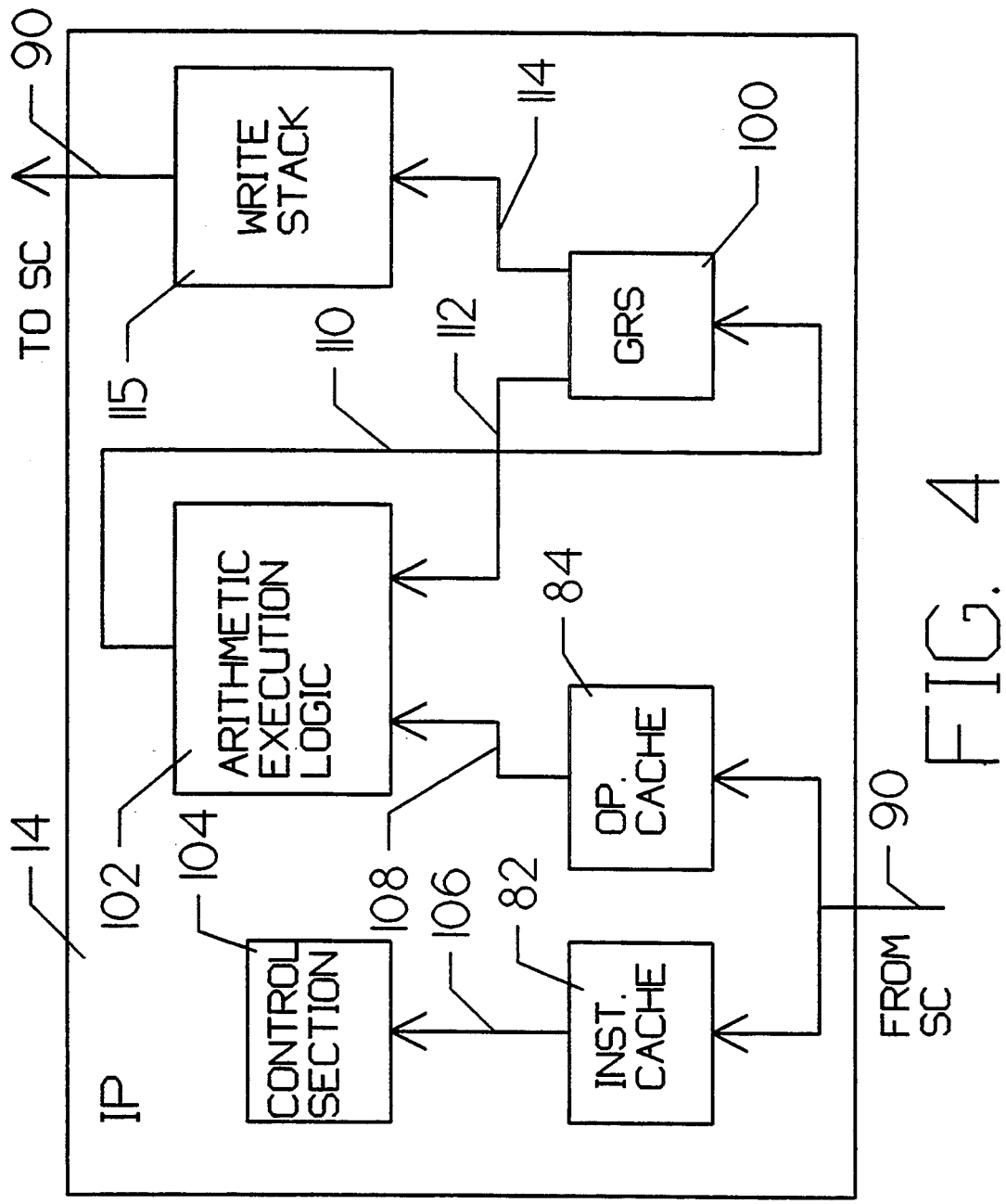
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. This is discussed in greater depth below. Arithmetic execution logic 102 receives operand data via path 108 and performs the specified operation using a combination of microcode controller and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
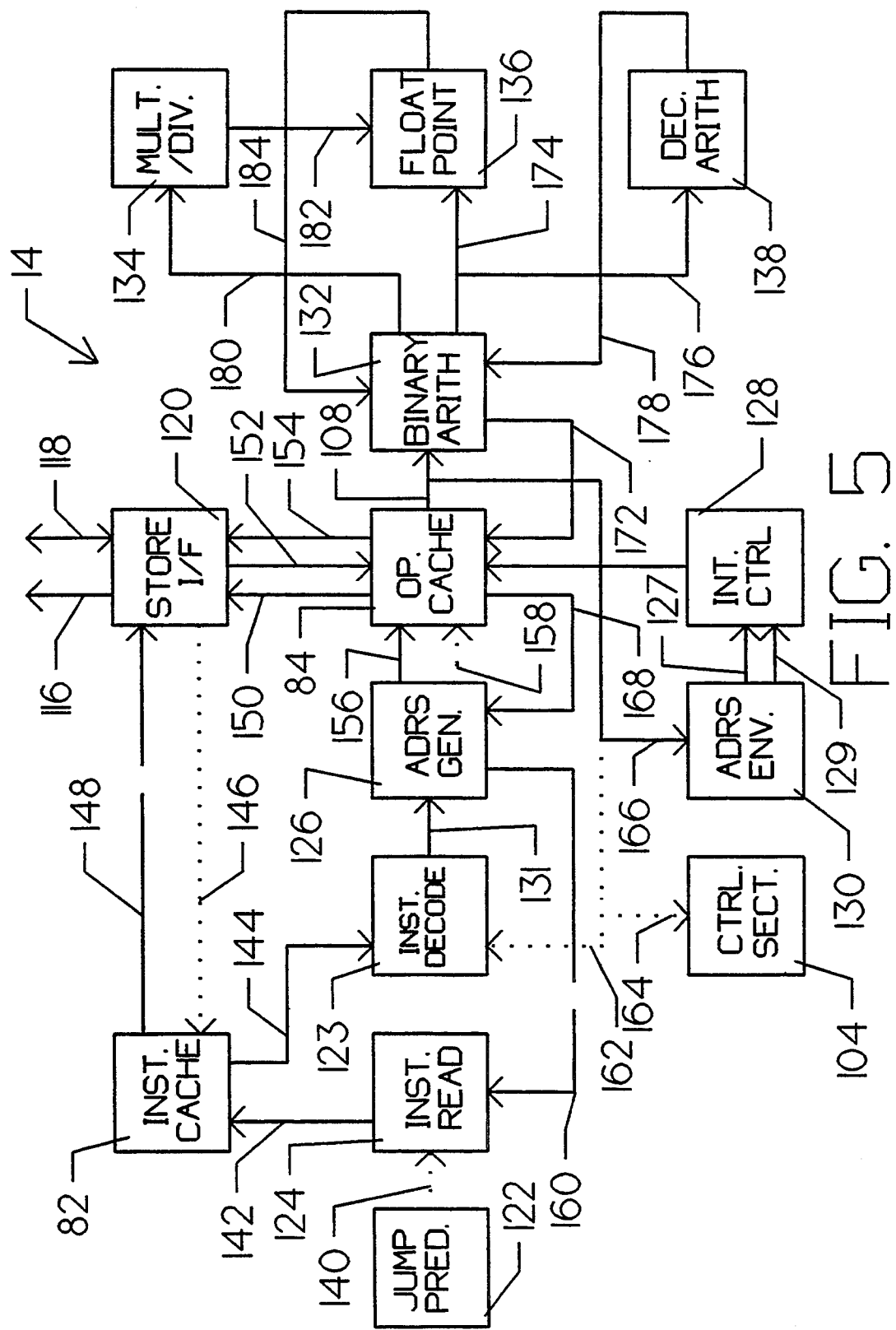
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72 bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36 bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130 as explained in more detail below. If the instruction is the next sequential instruction, its address is determined by incrementing the program address counter. If the instruction to be executed is addressed by a branch or jump instruction, the address is computed by address generator 126 and supplied via path 160. Alternatively, the address is supplied by jump prediction 122 via path 140 during operation in the jump prediction mode. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions, and those of most concern to the preferred mode of the present invention, involves a change to the base registers within addressing environment 130. The data is supplied to addressing environment 130 via path 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. A more detailed description of the timing of this pipelined operation may be found in the above referenced copending application which has been incorporated herein by reference. The remaining referenced components are as previously discussed.

Figure 6:
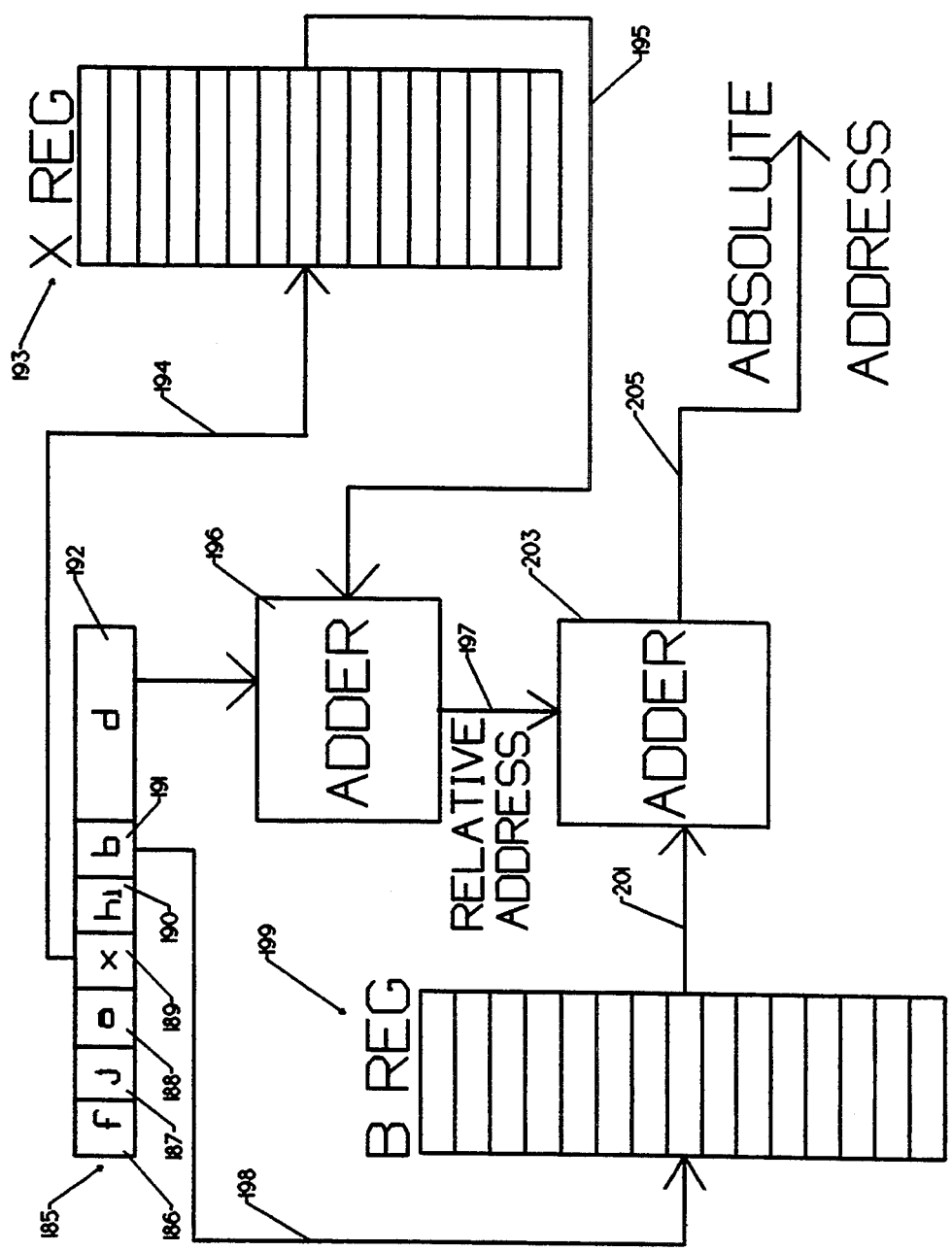
FIG. 6 shows the generation of an absolute operand address for an extended mode instruction.

FIG. 6 is a schematic diagram showing the formation of an absolute operand address. Instruction 185 is a 36 bit word containing an extended mode instruction. Function code 186 specifies the operation to be performed. J field 187 provides for interpretation of the operand. The use of a particular index register is designated by x field 189. Hi field 190 provides operand mode and indirect addressing options. B field 191 is a four bit field, which in the extended mode, identifies one of the 15 user base registers. An operand displacement is provided by d field 192. A more detailed explanation of the instruction format may be obtained from the above referenced, commonly assigned, co-pending U.S. patent application.

One of the 15 locations of base register stack 199 is selected by the contents of b field 191 supplied by cable 198. The format for the contents of base register stack 199 is explained in more detail below. The address read from the selected base register location is provided to adder 203 via cable 201 wherein it is added to the relative address received from adder 196 via cable 197. The output of adder 203 is an absolute address provided on cable 205

The x field 189 is a four bit quantity used to select one of the 16 index registers of index register stack 193 via cable 194. The contents of the selected index register is an address index which is supplied to adder 196 via cable 195. Adder 196 adds the address index to the displacement received from d field 192. The sum is a relative address which is provided to adder 196 via cable 197.

Figure 7:
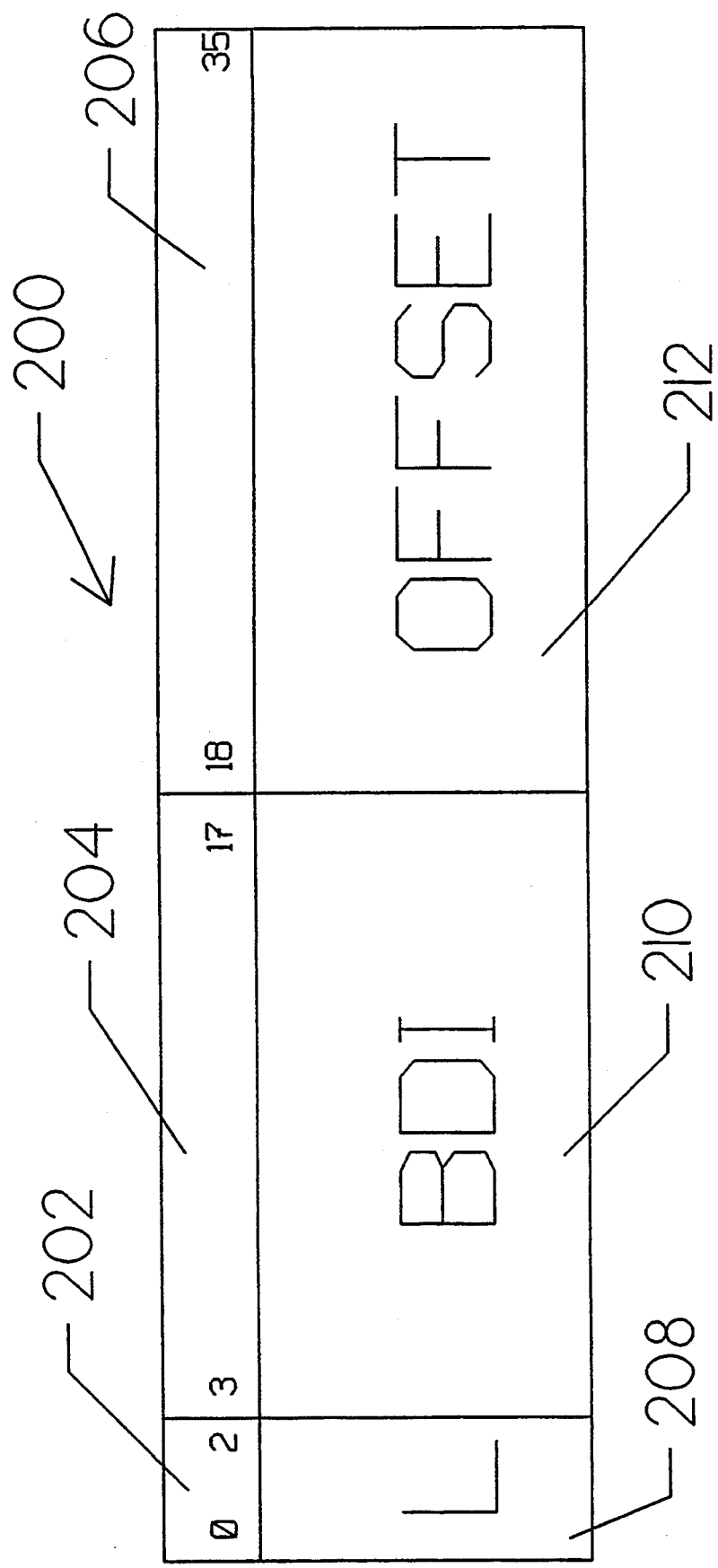
FIG. 7 shows the format of a virtual address.

FIG. 7 shows the format 200 of a virtual address. As explained above, the virtual address is used by an application program to specify the location of a data segment. To permit execution of the user program, this virtual address must be converted through paging to an absolute address for reference to a physical storage location. However, great flexibility is provided by permitting the user program to define the data segment using this virtual address.

The virtual address format 200 has a width of 36 bits which are divided into three separate fields. Field 202, consisting of the three least significant bit positions 0–2, contains variable 208, designated "L". This variable is a control character which selects one of the eight bank descriptor tables.

Bit positions 3–17 are partitioned as field 204. This 15 bit field is used to store variable "BDI", the Bank Descriptor Index. The BDI provides an index into the bank descriptor table selected by L variable 208. This index uniquely defines one of the bank descriptors within the table. An absolute address is computed using the contents of the uniquely identified entry in the bank descriptor table.

The most significant half of the base register entry (i.e. bit positions 18–35) define field 206 which is used to store offset 212. This variable is added to the base address contents of the uniquely identified entry within the bank descriptor table to produce the address to be loaded into the base register being referenced.

FIG. 8 shows active base table 214 comprising the entire set of 15 virtual addresses which define the contents of the user base registers. This set of virtual addresses corresponds to base registers B1, B2, . . . , and B15. Loaded into the active base table are entries 216, 218, . . . , and 244, respectively. Each of these entries is as defined in FIG. 7.

Figure 9:
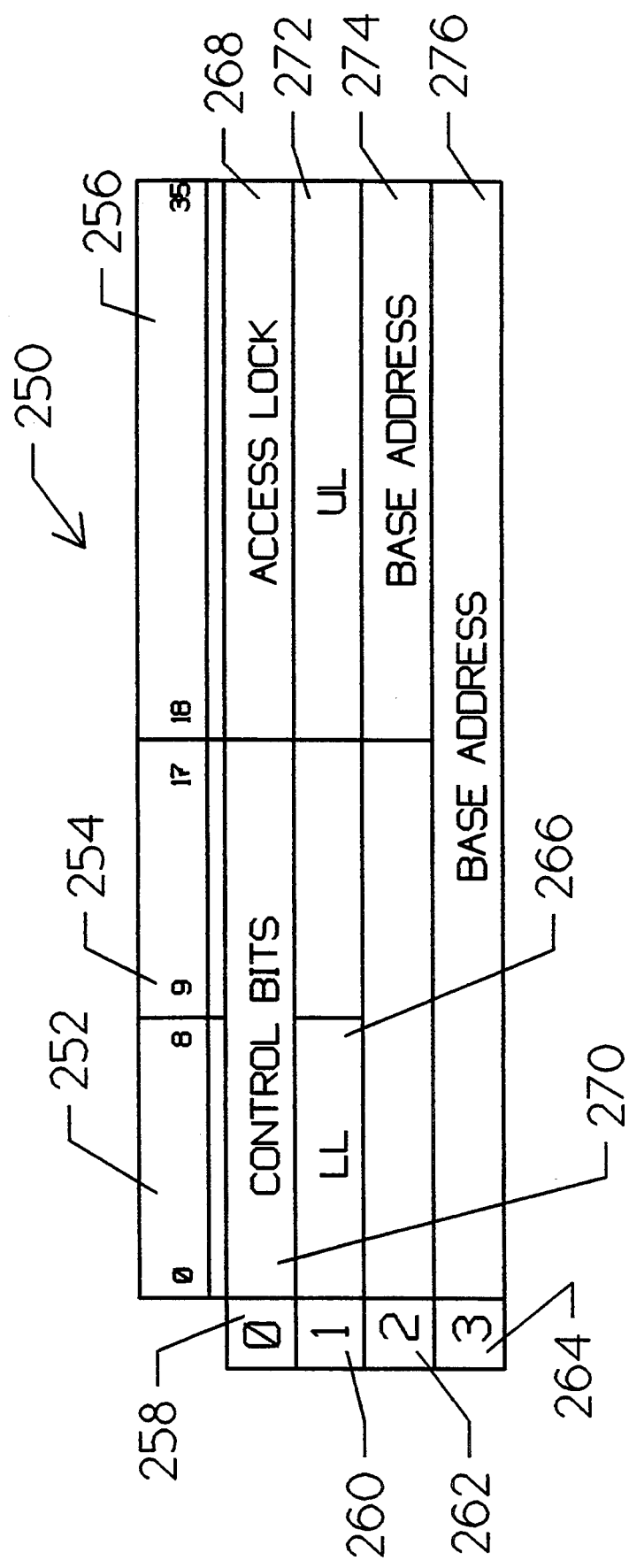
FIG. 9 shows the format of a base register entry.

FIG. 9 shows the format for one entry 250 in one of the 15 user base registers. Each entry consists of four 36 bit words (i.e. words 258, 260, 262, and 264), wherein each word has lower quarter 252, second quarter 254, and upper half 256. Word 258 has a number of control bits 270 within lower quarter 252 and second quarter 254. Upper half 256 of word 258 contains access lock 268.

Lower limit 266 is located in lower quarter 252 of word 260. Upper limit 272 is located in upper half 256 of word 260. Upper limit 272 and lower limit 266 are used to set the security limits on user program access to the associated data segment.

The base address consists of portion 274 located in upper half 256 of word 262 and portion 276 located in the entire 36 bits of word 264. In this manner, an absolute storage space of $2^{52}$ words of 36 bits each can be uniquely addressed by the absolute address.

Figure 10:
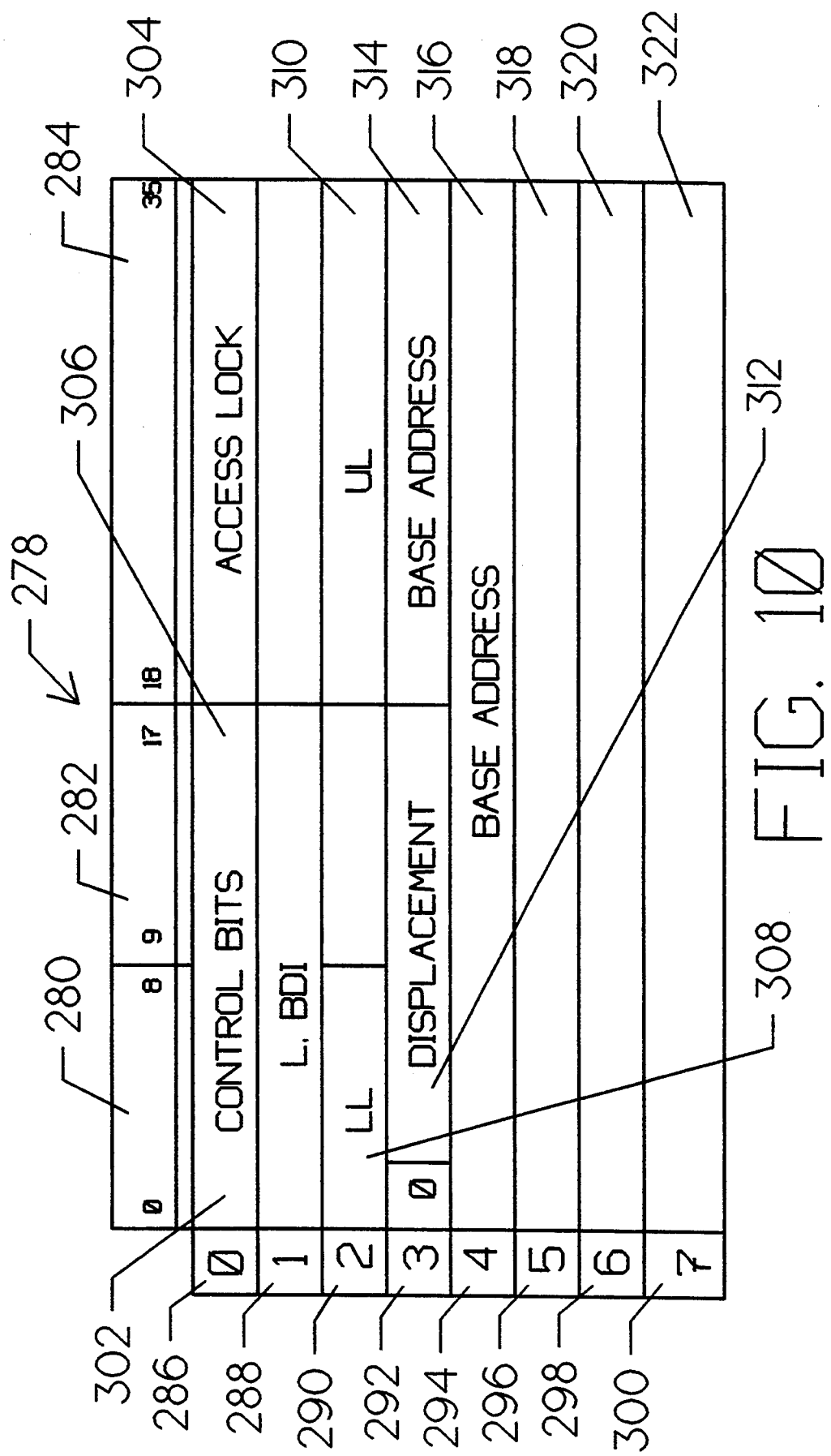
FIG. 10 shows the format of a bank descriptor table entry.

FIG. 10 shows the format 278 for an entry in one of the eight bank descriptor tables. Each bank descriptor table may accommodate up to $2^{15}$ entries (i.e. the maximum number which can be uniquely specified by BDI field 210 of virtual address format 220, see also FIG. 7). A single entry consists of eight 36 bit words (i.e. words 286, 288, 290, 292, 294, 296, 298, and 300). Each word consists of lower quarter 280, second quarter 282, and upper half 284.

Control bits 302 are contained in lower quarter 280 and second quarter 282 of word 286. Access lock 304 is located within upper half 284 of word 286. The L and BDI fields of the virtual address which identifies the entry are located in lower quarter 280 and second quarter 282 of word 288.

The 52 bit absolute address to be added to the offset of the virtual address consists of portion 314 located within upper half 284 of word 292 and portion 316 which occupies all of word 294. Lower limit 308 and upper limit 310 are located within word 290 as shown. Displacement 312 is located within word 292. User program variables 318, 320, and 322 are stored within words 296, 298, and 300, respectively.

Figure 11:
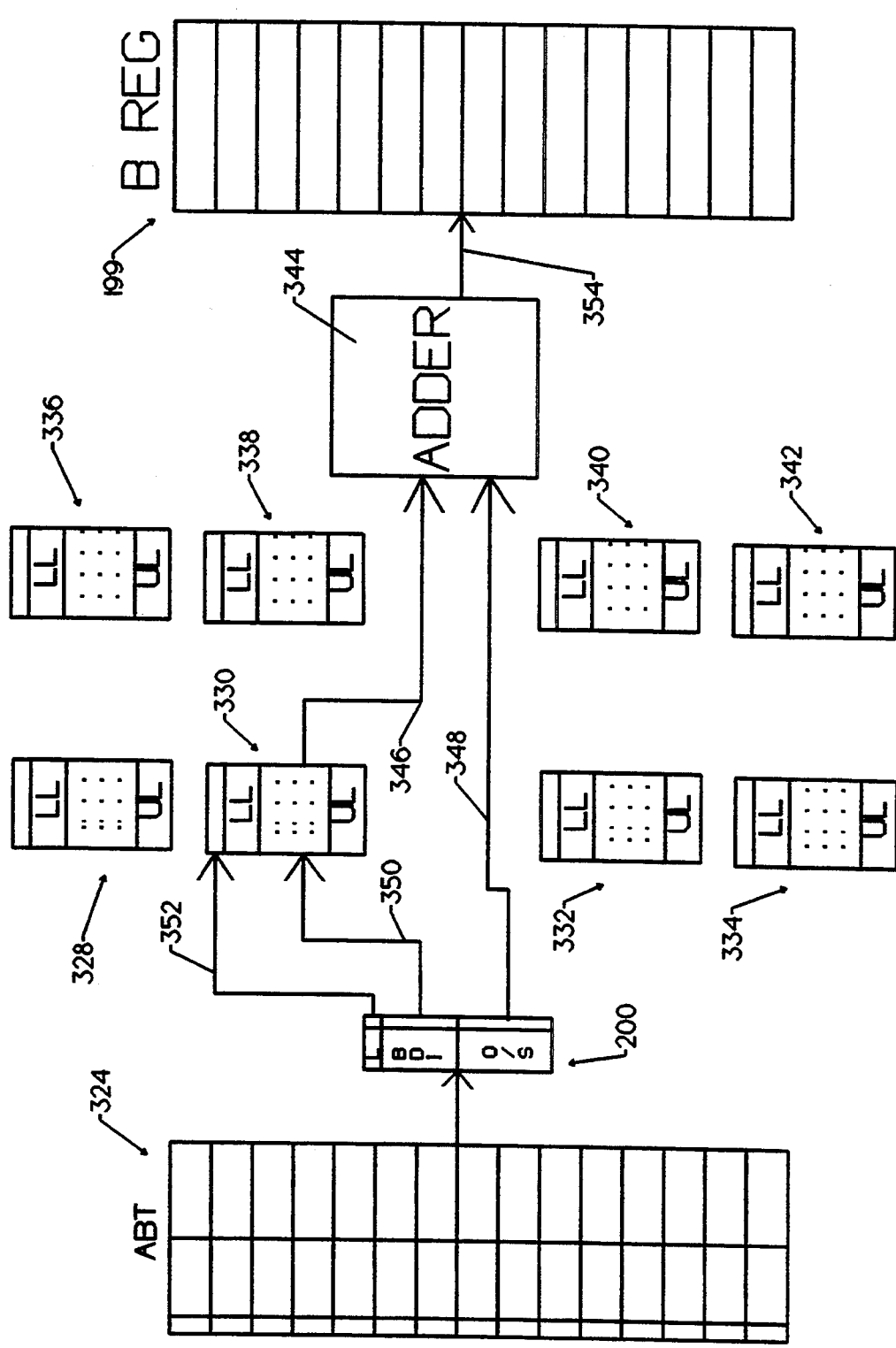
FIG. 11 shows the conversion of a virtual address into an absolute address for loading a base register.

FIG. 11 is a schematic diagram for the general process of loading a base register using a virtual address. To load a base register, a virtual address (see also FIG. 7) is loaded into the corresponding location of active base table 324 (see also FIG. 8). The L field is supplied from virtual address 200 via cable 352 to select one of the eight bank descriptor tables (i.e. bank descriptor tables 328, 330, 332, 334, 336, 338, 340, and 342). In the present example, bank descriptor table 330 is selected.

Of the $2^{15}$ entries (see also FIG. 10) within bank descriptor table 330, one is selected using the bank descriptor index field (i.e. BDI 210) of virtual address 200 transferred via cable 350. As explained above, the selected bank descriptor table entry contains lower limits, upper limits and a 52 bit address (see also FIG. 10). The 52 bit address is transferred to adder 344 via cable 346. Offset field 212 of virtual address 200 is transferred to adder 344 via cable 348. The 52 bit sum computed by adder 344 is loaded via cable 354 into the selected base register of base register stack 199.

Note that the selection and access of one of the bank descriptor table entries must be made in general, if the previous content of the base register was determined with either a different bank descriptor table or a different entry within that bank descriptor table. However, when changing a base register entry, if the same base descriptor table and same entry within that table are used, the previous contents and future contents of the base register will differ only by the difference in the previous and present offsets. Therefore, such a base register change can be accomplished without any need to access the bank descriptor tables. In that case, the appropriate base register can be modified using the difference of the offsets. It has been shown in benchmark analyses that up to 85% of the user base register changes made during the execution of the user program change only the offset.

Figure 12:
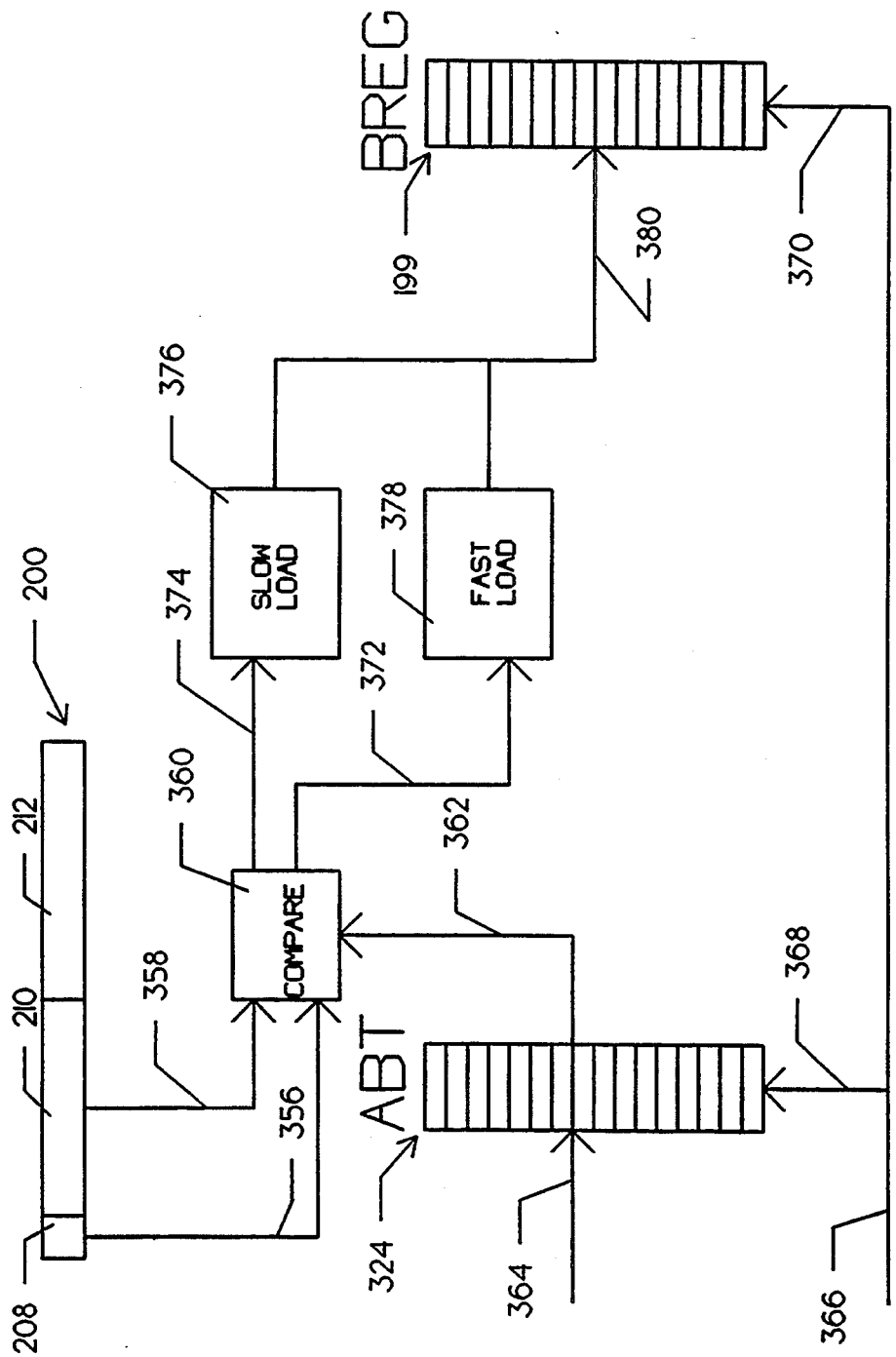
FIG. 12 is a schematic diagram showing how the decision is made to employ the fast or slow user base register load.

FIG. 12 is a schematic diagram showing selection of one of the two alternative methods of updating a base register. The virtual address 200 is retrieved using the operand of the load user base register instruction. L field 208 and BDI field 210 are supplied to comparator 360 by cables 356 and 358, respectively. Active base table 324 is accessed using the designation of the base register to be modified supplied via cable 366. As the new virtual address is entered into the appropriate location of active base table 324, the previous contents are supplied to comparator 360 via cable 362. Comparator 360 compares the L and BDI fields of the previous entry with those of the new virtual address 200. If equal, fast load logic 378 is selected via cable 372. If unequal, slow load logic 376 is selected via cable 374.

Fast load logic 378 computes the new value to be stored within the appropriate base register. This value may be conveniently determined in several ways. In a first approach, the bank descriptor (i.e. absolute address for the initial location of the bank) may be saved from the previous loading of the base register. This requires sufficient random access storage to hold the bank descriptor relative to the base register designation to save the time needed to access the corresponding bank descriptor table. In this embodiment, the new Offset is added to the previous bank descriptor with the sum loaded into the base register.

In an alternative embodiment, fast load logic 378 subtracts the previous offset from the future offset. This difference is added to the current absolute address of the base register to be modified via cable 380. The base register is selected by cable 370. For either embodiment, no further memory accesses or computations are required resulting in a substantial performance enhancement.

Slow load logic 376 discards the previous virtual address and performs the loading of the selected base register in accordance with the previous description (see FIG. 11). With either slow load or fast load, the relative limits must be set.

Figure 13:
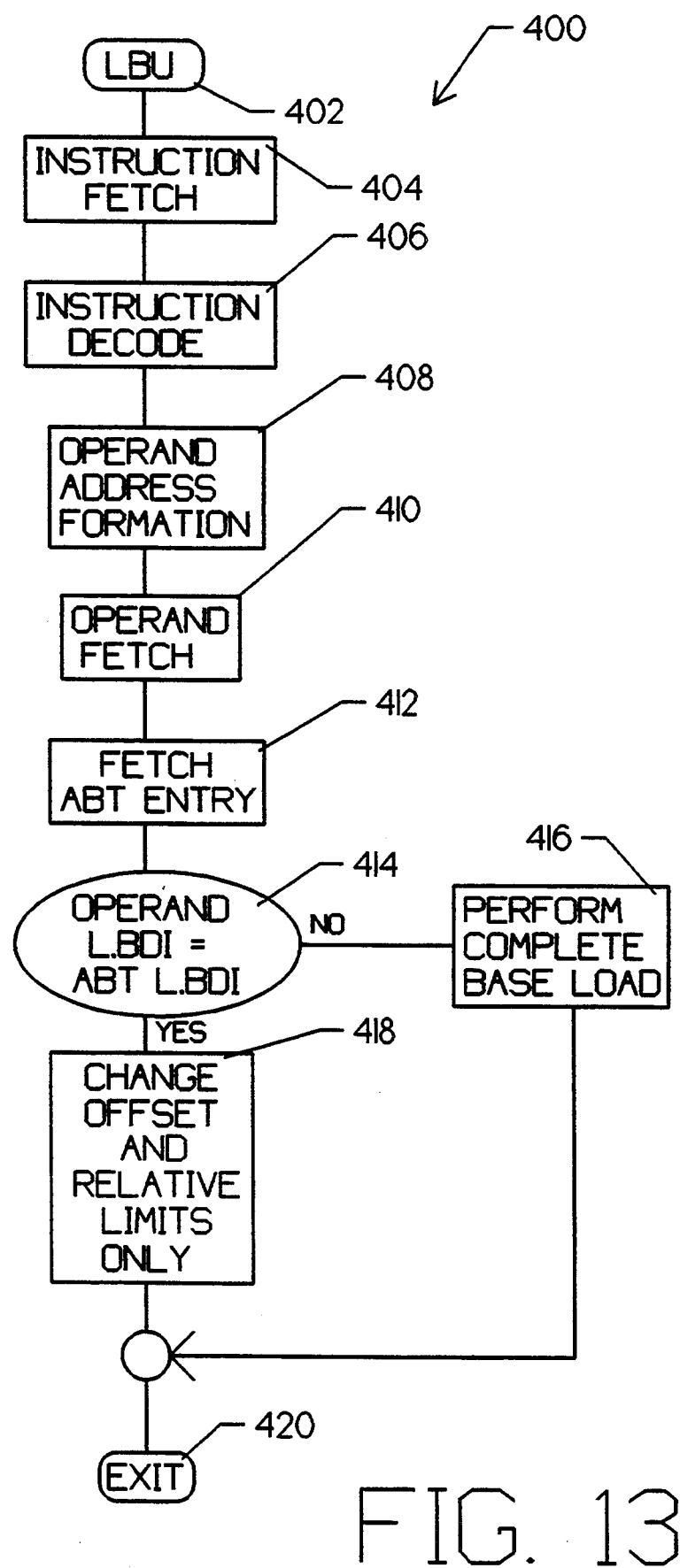
FIG. 13 is a flow chart showing the logical operation of the load user base register instruction.

FIG. 13 is a flow chart 400 for the operation of the load base user instruction 402. The instruction is fetched by element 404 in the usual fashion. The instruction is decoded at element 406 to determine that the instruction is a load base user instruction. Element 408 forms the operand address as explained above. The operand is fetched at element 410. As explained above, this operand consists of a virtual address having the format shown in FIG. 7.

Element 412 fetches the active base table entry corresponding to the base register to be modified. The L and BDI fields of the operand virtual address and the active base table virtual address are compared at element 414. If a match is not found, control is given to element 416 to perform a complete (i.e. slow) load of the selected base register. If a match is found, element 418 computes the new base register entry as explained above and loads the 52 bit address into the selected base register. The instruction is completed at element 420.

Having thus described the preferred embodiments of the present invention, those of skill in the art will readily appreciate that the teachings found herein may be applied to yet other embodiments within the scope of the claims hereto attached.

We claim:

1. A method for updating the contents of a base register from a previous absolute address to a new absolute address wherein said previous absolute address corresponds to a previous virtual address having a previous bank descriptor index and a previous offset and wherein said new absolute address corresponds to a new virtual address having a new bank descriptor index and a new offset comprising:
   a. comparing said new bank descriptor index to said previous bank descriptor index;
   b. subtracting said new offset from said previous offset and providing a net difference;
   c. adding said net difference to said previous offset and provide the result to said base register if step (a) determines equality.

2. A method of changing a base register from a previous content to a future content comprising:
   a. determining whether said future content will differ from said previous content by an offset; and
   b. adding said offset to said previous content if said determining step determines that said future content will differ from said previous content by said offset.

3. A data processing apparatus comprising;
   a. an active base table for storing a virtual address having a bank descriptor index and an offset;
   b. a base register for storing an absolute address corresponding to said virtual address;
   c. a bank descriptor table coupled to said active base table and said base register for specifying an address associated with said bank descriptor index;
   d. means coupled to said bank descriptor table, said base register, and said active base table for adding said offset to said address to produce said absolute address; and
   e. means coupled to said adding means, said bank descriptor table, said base register, and said active base table for ascertaining whether a new absolute address differ from said absolute address by an amount equal to the difference between a new offset and said offset and if so, for adding said difference to said absolute address to produce said new absolute address.

4. A data processing system having a memory for storing operands in memory locations relative to a base absolute address and having an instruction processor for executing a program wherein said operands are specified relative to a base virtual address having a bank descriptor index and an offset and wherein said base virtual address is assigned a value corresponding to said program to identify a particular segment within said memory and wherein said base virtual address is loaded into a first register within said instruction processor to permit access of said segment by said program and wherein a new base virtual address having a new bank descriptor index and a new offset can be loaded into said first register at a later time to identify a different segment within said memory corresponding to said program and wherein said base absolute address is determined by adding an address specified by said bank descriptor index to said offset, the improvement for modifying said base absolute address to utilize said new base virtual address comprising:
   a. a comparator located within said instruction processor for comparing said bank descriptor index of said new base virtual address to said bank descriptor index of said base virtual address; and
   b. a modifying circuit coupled to said comparator for modifying said base absolute address by an amount equal to the difference between said new offset of said new base virtual address and said offset of said base virtual address if said comparator determines equality.

5. In a data processing system having a memory for storing operands in memory locations relative to a base absolute address and having an instruction processor for executing a program wherein said operands are specified relative to a base virtual address having bank descriptor index and an offset and wherein said base virtual address is assigned a value corresponding to said program to identify a particular segment within said memory and wherein said base virtual address is loaded into a first register within said instruction processor to permit access of said segment by said program and wherein a new base virtual address having a new bank descriptor index and a new offset can be loaded into said first register at a later time to identify a different segment within said memory corresponding to said program and wherein said base absolute address is determined by adding an address specified by said bank descriptor index to said offset, the improvement for modifying said base absolute address to utilize said new base virtual address comprising:
   a. means located within said instruction processor for comparing said new bank descriptor index of said new base virtual address to said bank descriptor index of said base virtual address; and
   b. means coupled to said comparing means for changing said base absolute address by an amount equal to the difference between said new offset of said new base virtual address and said offset of said base virtual address if said comparing means determines equality.

6. The improvement of claim 5 wherein said base absolute address is stored within a base register.

7. The improvement of claim 6 wherein said base virtual address is stored within an active base table.

8. The improvement of claim 7 further comprising a plurality of base registers.

9. The improvement of claim 8 further comprising a plurality of locations within said active base table.

10. The improvement of claim 9 wherein each of said plurality of base registers corresponds to a different one of said plurality of locations within said active base table.

11. A data processing apparatus comprising;
   a. an active base table for storing a virtual address having a bank descriptor index and an offset;
   b. a base register for storing an absolute address corresponding to said virtual address;
   c. a bank descriptor table coupled to said active base table and said base register for specifying an address associated with said bank descriptor index;
   d. an adder coupled to said bank descriptor table, said base register, and said active base table for adding said offset to said address to produce said absolute address; and
   e. a processing circuit coupled to said adding means, said bank descriptor table, said base register, and said active base table for ascertaining whether a new absolute address will differ from said absolute address by an amount equal to the difference between a new offset and said offset and if so, for adding said difference to said absolute address to produce said new absolute address.

12. A data processing apparatus comprising;
   a. first storing means for storing a virtual address having a bank descriptor index and an offset;
   b. second storing means for storing an absolute address corresponding to said virtual address;

c. third storing means coupled to said first storing means and said second storing means for specifying an address associated with said bank descriptor index;

d. adding means coupled to said first storing means, said second storing means, and said third storing means for adding said offset to said address to produce said absolute address; and e. ascertaining means coupled to said adding means, said first storing means, said second storing means, and said third storing means for ascertaining whether a new absolute address will differ from said absolute address by an amount equal to the difference between a new offset and said offset and if so, for adding said difference to said absolute address to produce said new absolute address.

13. A data processing system having a memory for storing operands in memory locations relative to a base absolute address and having an instruction processor for executing a program wherein said operands are specified relative to a base virtual address having a bank descriptor index and an offset and wherein said base virtual address is assigned a value corresponding to said program to identify a particular segment within said memory and wherein said base virtual address is loaded into a first register within said instruction processor to permit access of said segment by said program and wherein a new base virtual address having a new bank descriptor index and a new offset can be loaded into said first register at a later time to identify a different segment within said memory corresponding to said program and wherein said base absolute address is determined by adding an address specified by said bank descriptor index to said offset comprising:

a. an active base table coupled to said first register wherein said active base table has a plurality of locations for storing said base virtual address;

b. a plurality of base registers wherein each of said plurality of base registers corresponds to a different one of said plurality of locations within said active base table for storing said base absolute address;

c. a plurality of bank descriptor tables coupled to said active base table and said plurality of base registers wherein said bank descriptor index of said base virtual address selects one of said plurality of bank descriptor tables and wherein said bank descriptor index accesses a specific entry in the selected one of said plurality of bank descriptor tables to produce a bank descriptor address;

d. an adder coupled to said plurality of bank descriptor tables, said plurality of base registers, and said active base table for adding said offset to said bank descriptor address to produce said base absolute address;

e. a comparator circuit located within said instruction processor for comparing said new bank descriptor index of said new base virtual address to said bank descriptor index of said base virtual address: and f. a modifying circuit coupled to said comparator circuit, said plurality of base registers, and said active base table for changing said base absolute address by an amount equal to the difference between said new offset of said new base virtual address and said offset of said base virtual address if said comparator circuit determines equality.

14. A data processing apparatus having a memory for storing operands in memory locations relative to a base absolute address and having an instruction processor for executing a program wherein said operands are specified relative to a base virtual address having a bank descriptor index and an offset comprising:

a. a base register for storing said base absolute address;

b. an active base table;

c. a register coupled to said active base table for storing said base virtual address wherein said base virtual address is loaded from said register into said active base table and wherein a new base virtual address having a new bank descriptor index and a new offset is loaded into said register at the same time;

c. a plurality of bank descriptor tables coupled to said active base table and to said base register wherein said bank descriptor index of said base virtual address selects one of said plurality of bank descriptor tables and wherein said bank descriptor index accesses a specific entry in the selected one of said plurality of bank descriptor tables to produce a bank descriptor address;

d. a first adder coupled to said plurality of bank descriptor tables, said base register and said active base table for adding said offset to said bank descriptor address to produce said base absolute address;

e. a comparator coupled to said first adder, said register, said base register and said active base table for comparing said new bank descriptor index to said bank descriptor index and for providing a fast flag if equality is determined;

f. a substraction circuit couple to said active base table, said register and to said comparator for subtracting said new offset from said offset and providing a net difference; and g. a second adder coupled to said subtraction circuit, said comparator and said base register for adding said net difference to said offset if said fast flag is set and providing the result to said base register.

15. An apparatus according to claim 14 wherein said active base table comprises a register stack.

16. An apparatus according to claim 14 wherein said active base table comprises a Random Access Memory.

17. An apparatus according to claim 14 wherein said base register comprises a register stack.

18. An apparatus according to claim 14 wherein said base register comprises a Random Access Memory.

19. An apparatus according to claim 14 wherein said bank descriptor table comprises a register stack.

20. An apparatus according to claim 14 wherein said bank descriptor table comprises a Random Access Memory.

21. An apparatus according to claim 14 wherein said bank descriptor table comprises a Read Only Memory.

22. A data processing apparatus having a memory for storing operands in memory locations relative to a base absolute address and having an instruction processor for executing a program wherein said operands are specified relative to a base virtual address having a bank descriptor index and an offset comprising;

a. a first storing means for storing said base absolute address;

b. a second storing means;

c. a third storing means coupled to said second storing means for storing said base virtual address wherein said base virtual address is loaded from said third storing means into said second storing means and wherein a new base virtual address having a new bank descriptor index and a new offset is loaded into said third storing means at the same time;

d. a fourth storing means having a plurality of locations coupled to said second storing means and said first storing means wherein said bank descriptor index of said base virtual address selects one of said plurality of locations within said fourth storing means to produce a bank descriptor address;

e. adding means coupled to said fourth storing means, said first storing means, and said second storing means for adding said offset to said bank descriptor address to produce said base absolute address;

f. comparing means coupled to said adding means, said third storing means, said first storing means, and said second storing means for comparing said new bank descriptor index to said bank descriptor index and determining if a predetermined relationship exists;

g. subtraction means coupled to said second storing means, said third storing means, and said comparing means for subtracting said new offset from said offset and providing a net difference; and h. a second adding means coupled to said subtraction means, said comparing means, and said first storing means for adding said net difference to said offset if said comparing means determines said predetermined relationship exists and providing the results to said first storing means.

* * * * *